(12) United States Patent
Vijayakumar

(10) Patent No.: US 11,148,782 B2
(45) Date of Patent: Oct. 19, 2021

(54) AERODYNAMIC NACELLE STRAKES AS AXIAL LOCATOR

(71) Applicant: GOODRICH AEROSPACE SERVICES PRIVATE LIMITED, Bangalore (IN)

(72) Inventor: Saravanakumar Vijayakumar, Bengaluru (IN)

(73) Assignee: Rohr, Inc., Chula Vista, CA (US)

( * ) Notice: Subject to any disclaimer, the term of this patent is extended or adjusted under 35 U.S.C. 154(b) by 259 days.

(21) Appl. No.: 16/256,468

(22) Filed: Jan. 24, 2019

(65) Prior Publication Data
US 2020/0189716 A1 Jun. 18, 2020

(30) Foreign Application Priority Data
Dec. 13, 2018 (IN) .............................. 201841047198

(51) Int. Cl.
*B64C 7/02* (2006.01)
*B64D 29/06* (2006.01)
*B64C 23/06* (2006.01)

(52) U.S. Cl.
CPC ................ *B64C 7/02* (2013.01); *B64C 23/06* (2013.01); *B64D 29/06* (2013.01)

(58) Field of Classification Search
CPC ............ B64C 7/02; B64C 23/06; B64D 29/06
USPC .............................................. 244/130, 199.1
See application file for complete search history.

(56) References Cited

U.S. PATENT DOCUMENTS

| 3,960,345 A | 6/1976 | Lippert, Jr. | |
| 4,540,143 A * | 9/1985 | Wang | B64C 23/06 244/130 |
| 4,884,772 A * | 12/1989 | Kraft | B64C 23/06 244/199.1 |
| 5,864,922 A * | 2/1999 | Kraft | B64D 29/06 16/239 |
| 2010/0176249 A1* | 7/2010 | Schwetzler | B64C 7/02 244/199.1 |
| 2016/0083083 A1* | 3/2016 | Bordoley | B64C 21/10 244/200.1 |
| 2016/0243806 A1* | 8/2016 | Frost | B64C 7/00 |
| 2018/0170566 A1* | 6/2018 | Paolini | B64D 29/06 |
| 2018/0334249 A1* | 11/2018 | Binks | B64D 29/00 |
| 2019/0210710 A1* | 7/2019 | Dindar | B64C 7/02 |
| 2019/0367160 A1* | 12/2019 | Krier | B64D 29/00 |

FOREIGN PATENT DOCUMENTS

EP 2998219 3/2016

OTHER PUBLICATIONS

European Patent Office, European Search Report dated Apr. 29, 2020 in Application No. 19216202.2.

* cited by examiner

*Primary Examiner* — Brady W Frazier
(74) *Attorney, Agent, or Firm* — Snell & Wilmer L.L.P.

(57) ABSTRACT

A strake for a turbine engine nacelle may comprise a forward portion coupled to a turbine engine nacelle inlet, and an aft portion coupled to a turbine engine nacelle fan cowl, wherein the aft portion is configured to move between a first position and a second position, and the aft portion engages the forward portion in response to the aft portion moving to the second position to secure the fan cowl with respect to the inlet.

19 Claims, 6 Drawing Sheets

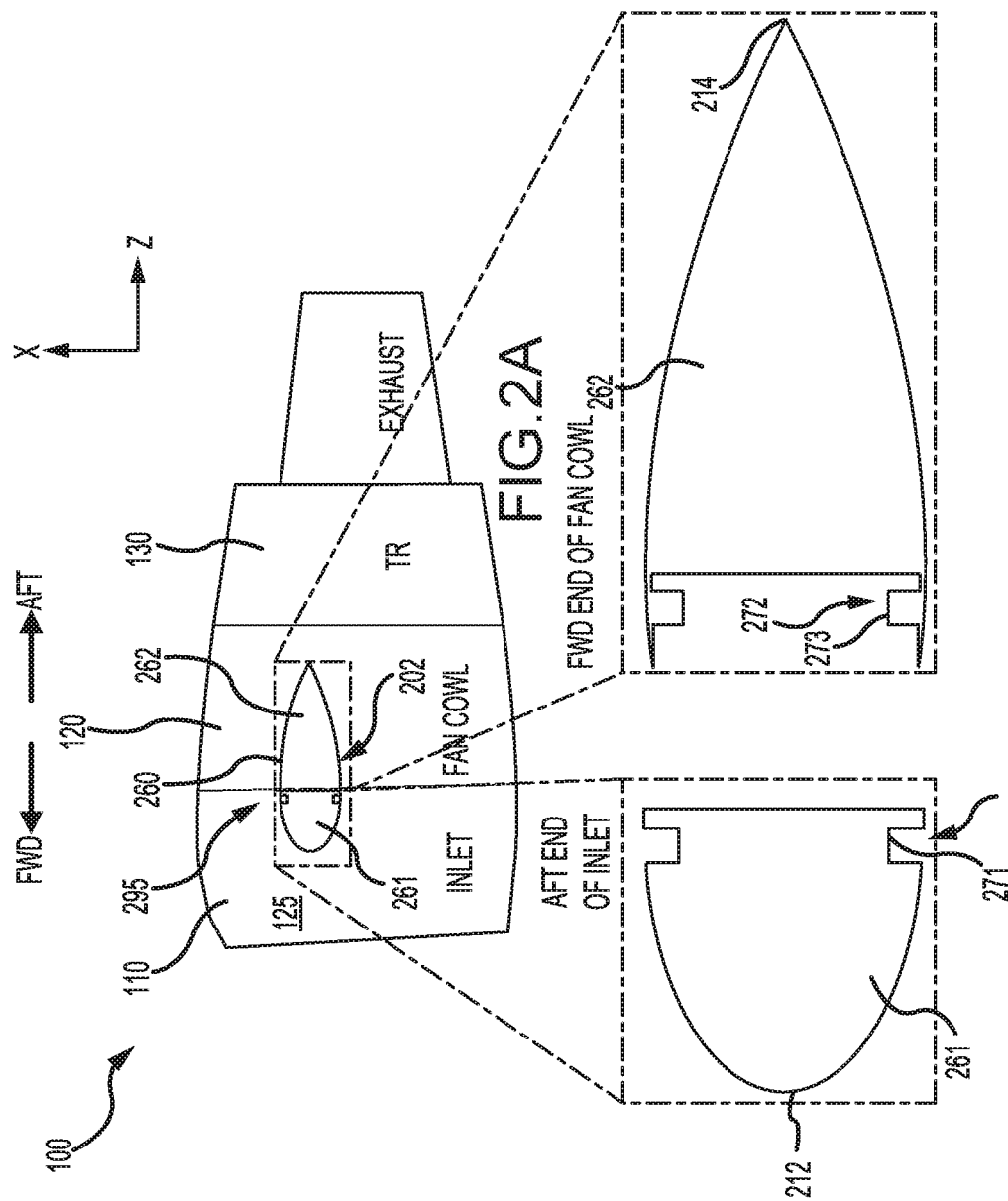

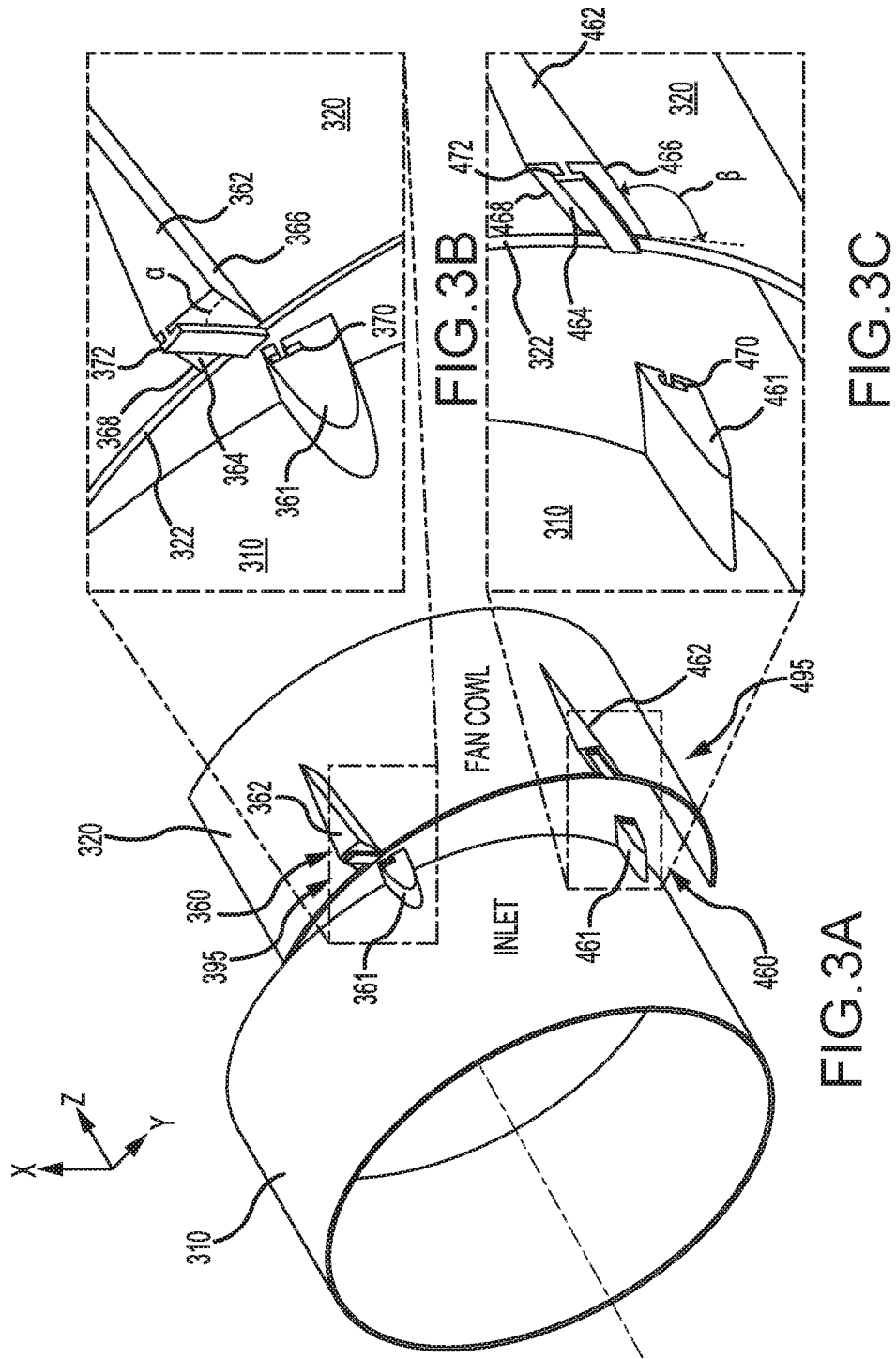

`US 11,148,782 B2`

AERODYNAMIC NACELLE STRAKES AS AXIAL LOCATOR

CROSS REFERENCE TO RELATED APPLICATION

This application claims priority to and the benefit of India patent application No. 201841047198 filed on Dec. 13, 2018 and entitled "AERODYNAMIC NACELLE STRAKES AS AXIAL LOCATOR," which is incorporated by reference herein in its entirety.

FIELD

The present disclosure relates generally to aerodynamic structures for use with aircraft and, more particularly to vortex generators.

BACKGROUND

On certain aircraft such as commercial airliners, tankers, airlifters, and transport aircraft, aircraft engines are typically mounted in nacelles that extend from pylons under the wing or that are mounted to the fuselage of the aircraft. In many aircraft, the leading edge of the engine nacelle is positioned forward of the wing leading edge. At high angles of attack, the engine nacelle sheds a wake. For aircraft where the engine nacelles are mounted in close proximity to the wing, the nacelle wake may flow over the wing leading edge and along the upper wing surface. Although the nacelle wake can be aerodynamically favorable under certain flight conditions, at high angles of attack close to the stalling angle where maximum lift is typically achieved, the nacelle wake can cause flow separation along the upper surface of the wing. Such flow separation may result in a reduction in the amount of lift that is producible by the wing in comparison to what might be achievable absent the nacelle wake.

Aircraft manufacturers have addressed the above-described flow separation phenomenon by installing various vortex-generating devices such as strakes (sometimes referred to as "chines") on the outer surface of the engine nacelle. The strake is typically mounted on a side of the engine nacelle and is sized and positioned to control the separation of the nacelle wake by generating a vortex that interacts beneficially with the wing upper surface boundary layer in order to reduce flow separation.

SUMMARY

A strake for a turbine engine nacelle is disclosed, comprising a forward portion comprising a first alignment feature disposed at an aft end of the forward portion, and an aft portion comprising a second alignment feature disposed at a forward end of the aft portion, wherein the first alignment feature engages the second alignment feature.

In various embodiments, the aft portion is configured to move between a first position and a second position, and the aft portion engages the forward portion in response to the aft portion moving to the second position to secure the aft portion with respect to the forward portion.

In various embodiments, the second alignment feature engages the first alignment feature in response to the aft portion moving to the second position.

In various embodiments, the aft portion is configured to move with a fan cowl between an open position and a closed position, and the second alignment feature engages the first alignment feature in response to the fan cowl moving to the closed position to minimize axial movement of the fan cowl with respect to an inlet of the nacelle.

In various embodiments, one of the first alignment feature and the second alignment feature comprises a tab and the other of the first alignment feature and the second alignment feature comprises a slot.

In various embodiments, the strake comprises an airfoil.

In various embodiments, the forward portion comprises a leading edge of the airfoil.

In various embodiments, the aft portion comprises a trailing edge of the airfoil.

In various embodiments, the first alignment feature is configured to receive the second alignment feature.

A vortex-generating arrangement is disclosed, comprising an inlet, a fan cowl, a strake comprising a forward portion and an aft portion, wherein the forward portion is coupled to the inlet and the aft portion is coupled to the fan cowl, and the aft portion is configured to move with the fan cowl between a first position and a second position, and the aft portion engages the forward portion in response to the aft portion moving to the second position to secure the aft portion with respect to the forward portion.

In various embodiments, the forward portion comprises a first alignment feature and the aft portion comprises a second alignment feature.

In various embodiments, the second alignment feature engages the first alignment feature in response to the aft portion moving to the second position.

In various embodiments, the aft portion is configured to move with the fan cowl between an open position and a closed position, and the second alignment feature engages the first alignment feature in response to the fan cowl moving to the closed position to minimize axial movement of the fan cowl with respect to the inlet.

In various embodiments, one of the first alignment feature and the second alignment feature comprises a tab and the other of the first alignment feature and the second alignment feature comprises a slot.

In various embodiments, the strake comprises an airfoil.

In various embodiments, the forward portion comprises a leading edge of the airfoil.

In various embodiments, the aft portion comprises a trailing edge of the airfoil.

In various embodiments, the first alignment feature is configured to receive the second alignment feature.

A method for installing a strake onto an aircraft structure is disclosed, comprising coupling a first portion of the strake to a fixed structure, and coupling a second portion of the strake to a moveable structure, wherein the second portion is configured to move between a first position and a second position, and the second portion engages the first portion in response to the second portion moving to the second position to secure the moveable structure with respect to the fixed structure.

In various embodiments, the fixed structure comprises a nacelle inlet and the moveable structure comprises a fan cowl.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2A illustrates a schematic outer view of a two-piece strake mounted to an aircraft structure, in accordance with various embodiments;

FIG. 2B illustrates a top view of a forward portion of the two-piece strake of FIG. 2A, in accordance with various embodiments;

FIG. 2C illustrates a top view of an aft portion of the two-piece strake of FIG. 2A, in accordance with various embodiments;

FIG. 3A illustrates an outer view of a first two-piece strake mounted to an aircraft structure and a second two-piece strake mounted to the aircraft structure, with a moveable structure in an open position, in accordance with various embodiments;

FIG. 3B illustrates an outer view of the first two-piece strake of FIG. 3A with a first alignment feature disengaged from a second alignment feature, in accordance with various embodiments;

FIG. 3C illustrates an outer view of the second two-piece strake of FIG. 3A with a first alignment feature disengaged from a second alignment feature, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

A nacelle for a turbine engine typically includes an inlet section, a fan cowl section, a thrust reverser section, and an exhaust section. The nacelle is typically mounted to a wing or a fuselage of an aircraft via a pylon. The fan cowl section is typically split into two halves comprising fan cowls. A strake may be manufactured as two separate pieces with a forward portion attached to the inlet section and an aft portion attached to one of the fan cowls for generating vortices at high angles of attack to lower aircraft stall speed. The forward and aft portions may engage each other in response to the fan cowl being moved to a closed position and may secure the fan cowl with respect to the inlet section. In this manner, the strake may serve to both generate vortices as well as axially locate and secure the fan cowl with respect to the inlet section.

Figure 1:
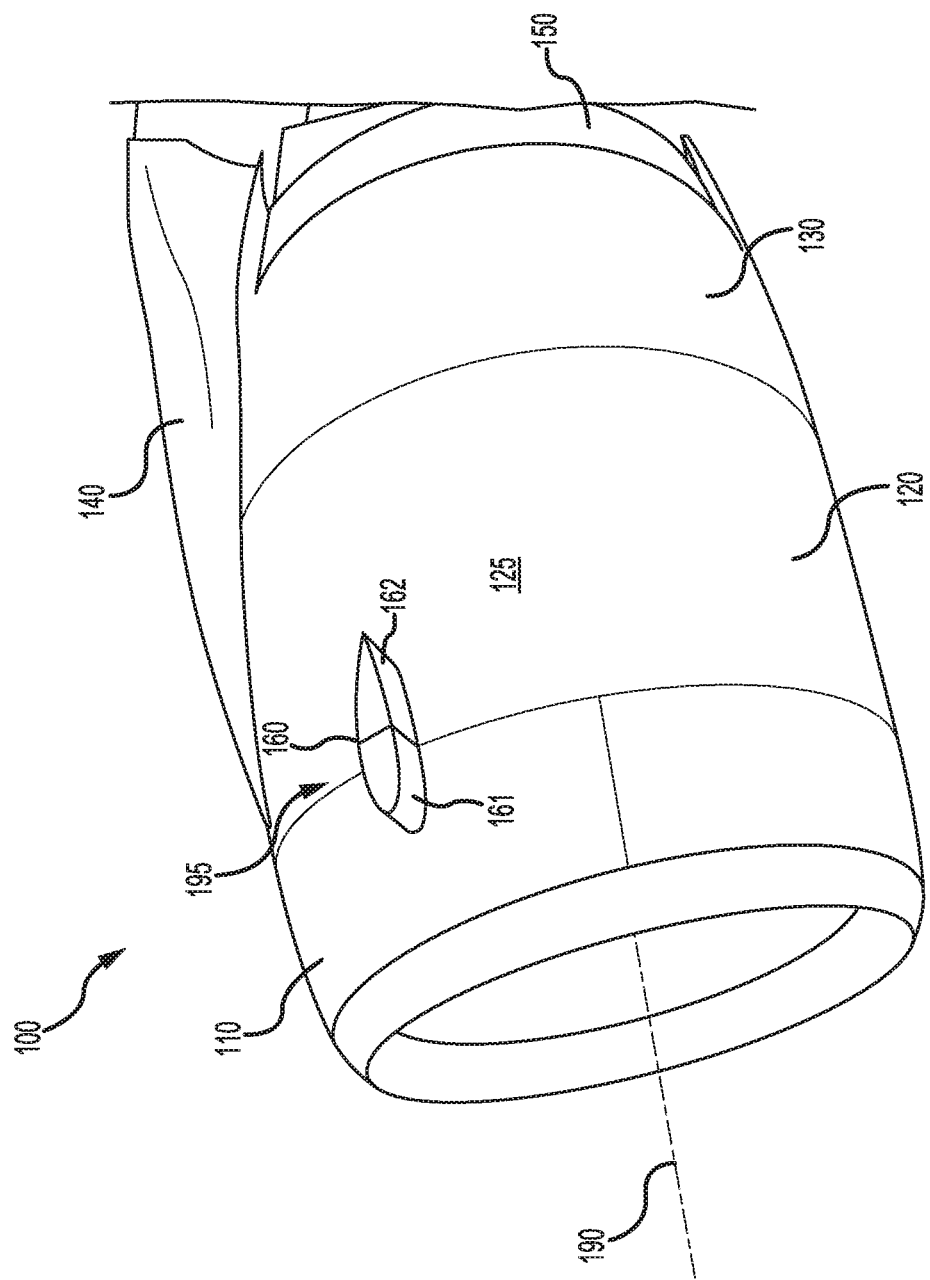
FIG. 1 illustrates a perspective view of an aircraft nacelle with a strake, in accordance with various embodiments.

With reference to FIG. 1, an aircraft member, illustrated as a nacelle 100 for a gas turbine engine, is illustrated according to various embodiments. Nacelle 100 may be suitable for an aircraft. Nacelle 100 may comprise a centerline 190. Nacelle 100 may comprise a nacelle inlet (also referred to herein as an inlet) 110, a fan cowl 120, and a thrust reverser 130. Fan cowl 120 may comprise two halves pivotally mounted to a pylon 140. In various embodiments, an exhaust nozzle 150 may extend from a turbine engine mounted within nacelle 100. Nacelle 100 may be coupled to pylon 140, which may mount the nacelle 100 to an aircraft wing or aircraft body. Nacelle 100 may comprise a vortex-generating arrangement 195. Vortex-generating arrangement 195 may comprise strake 160. In various embodiments, strake 160 is hollow. In various embodiments, strake 160 is solid. Strake 160 may extend radially outward, with respect to centerline 190, from nacelle 100. Strake 160 may be configured to generate vortices at operational angles of attack, such as takeoff, climbing, level flight, and other situations, to lower aircraft stall speed. In various embodiments, strake 160 may be configured to reduce drag of an aircraft at an operational angle of attack (e.g., during taking and/or landing). In this regard, strake 160 may be configured to reduce drag by redirecting at least a portion of fluid flow proximate an aircraft assembly, such as nacelle 100 for example.

Although illustrated as being above centerline 190, strake 160 may be disposed below centerline 190. In various embodiments, strake 160 may be disposed on nacelle 100 at any position relative to centerline 190. Stated differently, strake 160 may be disposed at any circumferential position along nacelle 100.

Vortex-generating arrangement 195 may comprise an aerodynamic surface 125. Aerodynamic surface 125 may be an outer surface of nacelle 100. However, it is contemplated herein, that vortex-generating arrangement 195 may comprise an aerodynamic surface 125 for any suitable aircraft member, such as a wing, fuselage, or tail, for example.

Strake 160 may be a two-piece arrangement comprising a forward portion 161 (also referred to herein as a first portion or a second portion) and an aft portion 162 (also referred to herein as a first portion or a second portion). Forward portion 161 may be coupled to nacelle inlet 110. Aft portion 162 may be coupled to fan cowl 120. Forward portion 161 may be operatively coupled to aft portion 162 in response to fan cowl 120 being in the closed position, as illustrated in FIG. 1.

Although described herein in detail as being coupled between nacelle inlet 110 and fan cowl 120, it is contemplated that strake 160 may be similarly coupled between fan cowl 120 and thrust reverser 130 without departing from the spirit and scope of the disclosure.

With combined reference to FIG. 2A, FIG. 2B, and FIG. 2C, a vortex-generating arrangement 295 comprising a strake 260 may be formed as an airfoil 202. In this regard, a forward portion 261 of strake 260 may define a leading edge 212 of airfoil 202 and an aft portion 262 of strake 260 may define a trailing edge 214 of airfoil 202.

In various embodiments, forward portion 261 may engage with aft portion 262 to axially align fan cowl 120 with respect to nacelle inlet 110. Forward portion 261 may engage with aft portion 262 to secure fan cowl 120 with respect to nacelle inlet 110 in the axial direction. Forward portion 261 may engage with aft portion 262 to mitigate movement of fan cowl 120 with respect to nacelle inlet 110 in the axial direction (i.e., mitigates forward and aft movement of fan cowl 120). In this regard, forward portion 261 may comprise an alignment feature (also referred to herein as a first alignment feature) 270 and aft portion 262 may comprise an alignment feature (also referred to herein as a second alignment feature) 272. Alignment feature 270 may be disposed at the aft end of forward portion 261. Alignment feature 272 may be disposed at the forward end of aft portion 262. In various embodiments, alignment feature 270 may comprise a slot 271. In various embodiments, alignment feature 272 may comprise a tab 273. Tab 273 may enter slot 271 in response to fan cowl 120 moving to a closed position (also referred to herein as a second position), as illustrated in FIG. 1 and FIG. 2A. In various embodiments, tab 273 may slide within slot 271. The geometry of tab 273 may be complimentary to the geometry of slot 271. Together, the tab 273 and slot 271 may act as an axial locator. In various embodiments, mechanical loads may be transferred between nacelle inlet 110 and fan cowl 120 via tab 273 and slot 271.

With combined reference to FIG. 3A, FIG. 3B, and FIG. 3C, an aircraft member, illustrated as a nacelle inlet 310 and a fan cowl 320, comprising a vortex-generating arrangement 395 and a vortex-generating arrangement 495 is illustrated, in accordance with various embodiments. The aircraft member may comprise one or both of vortex-generating arrangement 395 and vortex-generating arrangement 495. Vortex-generating arrangement 395 may comprise a two-piece strake 360 comprising a forward portion 361 and an aft portion 362. Forward portion 361 may engage with aft portion 362 to axially align fan cowl 320 with respect to nacelle inlet 310. Forward portion 361 may engage with aft portion 362 to secure fan cowl 320 with respect to nacelle inlet 310 in the axial direction. Forward portion 361 may engage with aft portion 362 to minimize forward and aft movement of fan cowl 320 with respect to nacelle inlet 310. In this regard, forward portion 361 may comprise an alignment feature (also referred to herein as a first alignment feature) 370 and aft portion 362 may comprise an alignment feature (also referred to herein as a second alignment feature) 372. Alignment feature 370 may be disposed at the aft end of forward portion 361. Alignment feature 372 may be disposed at the forward end of aft portion 362.

Figure 5A:
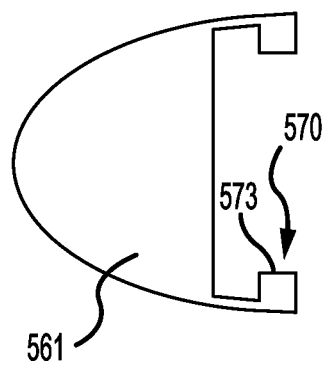
FIG. 5A illustrates a top view of a forward portion of a two-piece strake, in accordance with various embodiments.
Figure 5B:
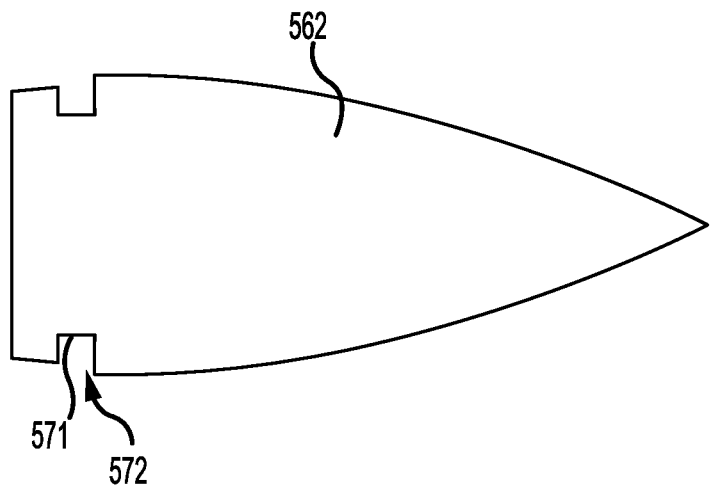
FIG. 5B illustrates a top view of an aft portion of a two-piece strake, in accordance with various embodiments.

Although alignment feature 270 and alignment feature 272 are described herein as comprising a slot and a tab, respectively, this configuration is reversible. Stated differently, it is contemplated herein that alignment feature 270 and alignment feature 272 may be configured as a tab and a slot, respectively. With combined reference to FIG. 5A and FIG. 5B, a forward portion 561 of a strake and an aft portion 562 of the strake, respectively, are illustrated. Forward portion 561 may comprise an alignment feature (also referred to herein as a first alignment feature) 570 and aft portion 562 may comprise an alignment feature (also referred to herein as a second alignment feature) 572. In various embodiments, alignment feature 570 may comprise a tab 573. In various embodiments, alignment feature 572 may comprise a slot 571. Tab 573 may enter slot 571 in response to fan cowl 120 (see FIG. 1 and FIG. 2A) moving to a closed position (also referred to herein as a second position).

Vortex-generating arrangement 495 may comprise a two-piece strake 460 comprising a forward portion 461 and an aft portion 462. Forward portion 461 may engage with aft portion 462 to axially align fan cowl 320 with respect to nacelle inlet 310. Forward portion 461 may engage with aft portion 462 to secure fan cowl 320 with respect to nacelle inlet 310 along the axial direction. Forward portion 461 may engage with aft portion 462 to minimize forward and aft movement of fan cowl 320 with respect to nacelle inlet 310. In this regard, forward portion 461 may comprise an alignment feature (also referred to herein as a first alignment feature) 470 and aft portion 462 may comprise an alignment feature (also referred to herein as a second alignment feature) 472.

In various embodiments, aft portion 362 is mounted onto fan cowl 320 and moves therewith. As fan cowl 320 moves from the open position (also referred to herein as a first position) to the closed position (also referred to herein as a second position), alignment feature 372 may enter into alignment feature 370, thereby securing fan cowl 320 in the longitudinal direction with respect to nacelle inlet 310. Stated differently, forward portion 361 may be longitudinally secured with respect to aft portion 362 in response to alignment feature 372 engaging with alignment feature 370. In this regard, alignment feature 370 may be configured to receive alignment feature 372.

Figure 3D:
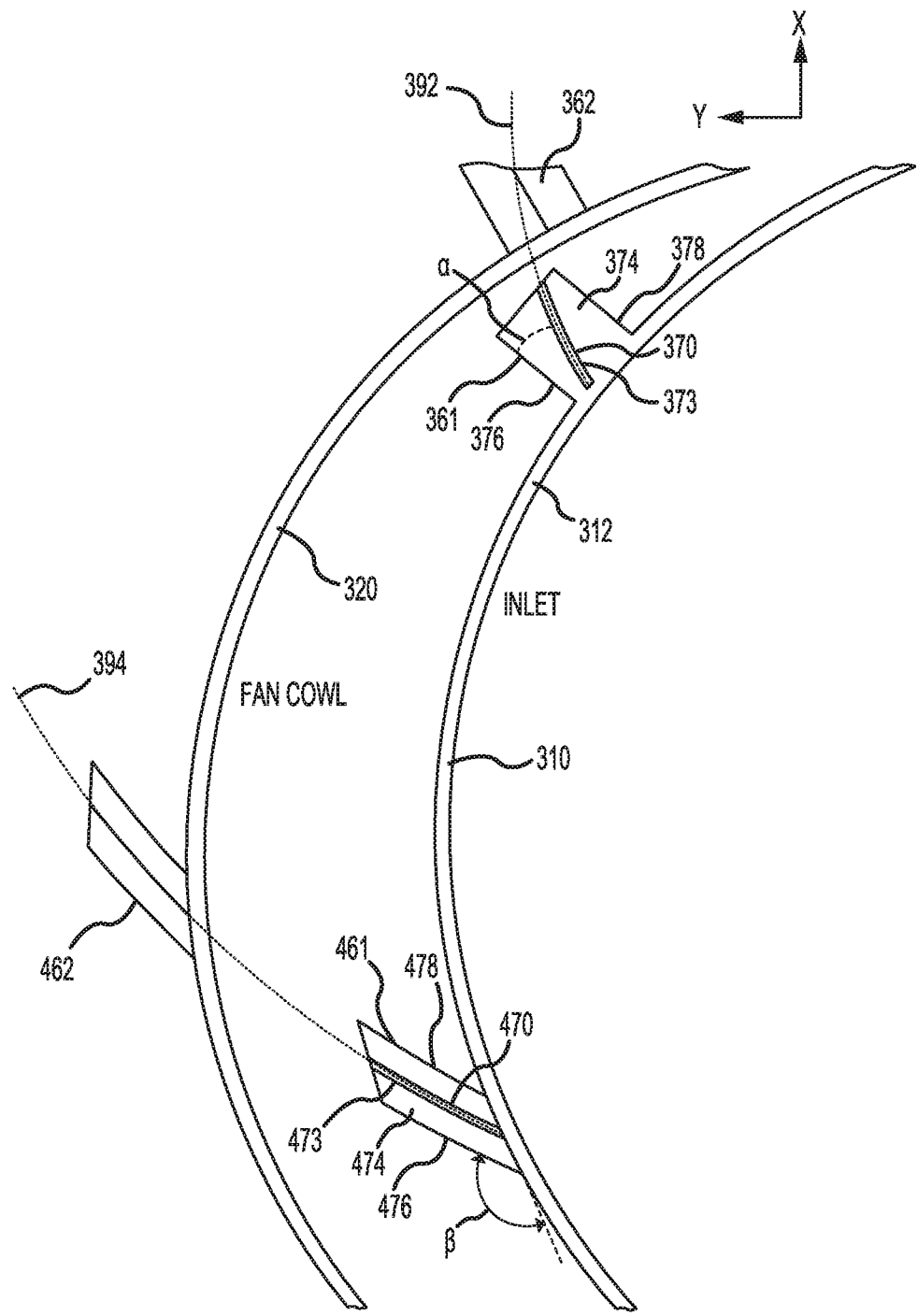
FIG. 3D illustrates an aft view of the aircraft structure of FIG. 3A, in accordance with various embodiments.

In various embodiments, strake 360 may be extend generally radially straight outward from the nacelle (i.e., from nacelle inlet 310 and/or fan cowl 320) with alignment feature 372 and alignment feature 370 curved in accordance with a trajectory of fan cowl 320 with respect to nacelle inlet 310 as illustrated in FIG. 3B and FIG. 3D, and as described below in greater detail.

With particular focus on FIG. 3B, fan cowl 320 may comprise a forward edge 322. Aft portion 362 may comprise a forward surface 364. Forward surface 364 may be flush with forward edge 322. Alignment feature 372 may extend from forward surface 364. Alignment feature 372 may extend forward of forward edge 322. Stated differently, alignment feature 372 may be disposed forward of forward edge 322 of fan cowl 320. Stated differently, alignment feature 372 may be disposed forward of fan cowl 320. Although illustrated as comprising a male alignment feature 372 which extends forward of fan cowl 320 to engage with a female alignment feature 370, it is contemplated herein that the alignment features may be swapped such that the forward portion comprises the male alignment feature 372 extending aft from nacelle inlet 310 to engage the female alignment feature 370 of aft portion 362.

In various embodiments, alignment feature 372 may be lofted or curved to accommodate the lofted or curved trajectory 392 (see FIG. 3D) of alignment feature 372 with respect to forward portion 361 in response to fan cowl 320 moving from the open position to the closed position, and vice versa. Aft portion 362 may comprise a first sidewall 366 and a second sidewall 368 disposed opposite the aft portion 362 from first sidewall 366. In this regard, alignment feature 372 may be disposed at an angle α with respect to first sidewall 366. Angle α may depend on the circumferential location of aft portion 362 with respect to fan cowl 320. In various embodiments, angle α is greater than zero degrees (>0°). Angle α may be a variable angle along the height (i.e., in the radial direction) of forward portion 361. In various embodiments, the angle α increases along the radially outward direction. Alignment feature 372 may be disposed between first sidewall 366 and second sidewall 368.

In various embodiments, strake 460 may be lofted or curved outward from the nacelle (i.e., from nacelle inlet 310 and/or fan cowl 320), 460 in accordance with a trajectory of fan cowl 320 with respect to nacelle inlet 310, with alignment feature 472 and alignment feature 470 oriented parallel with the curved geometry of strake 460 as illustrated in FIG. 3C and FIG. 3D, and as described below in greater detail.

With particular focus on FIG. 3C, aft portion 462 may comprise a forward surface 464. Forward surface 464 may be flush with forward edge 322. Alignment feature 472 may extend from forward surface 464. Alignment feature 472 may extend forward of forward edge 322. Stated differently, alignment feature 472 may be disposed forward of forward edge 322 of fan cowl 320. Stated differently, alignment feature 472 may be disposed forward of fan cowl 320. Although illustrated as comprising a male alignment feature 472 which extends forward of fan cowl 320 to engage with a female alignment feature 470, it is contemplated herein that the alignment features may be swapped such that the forward portion comprises the male alignment feature 472 extending aft from nacelle inlet 310 to engage the female alignment feature 470 of aft portion 462.

In various embodiments, aft portion 462 may be lofted or curved to accommodate the lofted or curved trajectory 394 (see FIG. 3D) of alignment feature 472 with respect to forward portion 461 in response to fan cowl 320 moving from the open position to the closed position, and vice versa. Aft portion 462 may comprise a first sidewall 466 and a second sidewall 468 disposed opposite the aft portion 462 from first sidewall 466. In this regard, aft portion 462 may extend from fan cowl 320 an angle β. Angle β may depend on the circumferential location of aft portion 462 with respect to fan cowl 320. Angle β may be a variable angle along the height (i.e., in the radial direction) of forward portion 461. In various embodiments, the angle β increases along the radially outward direction. Angle β may be greater than ninety degrees (>90°). Angle β may be between ninety degrees and one hundred and fifty degrees)(90°-150° at any given radial location of forward portion 461. Alignment feature 472 may be disposed parallel with sidewall 466. Alignment feature 472 may be disposed between first sidewall 466 and second sidewall 468.

With reference to FIG. 3D, forward portion 361 may comprise an aft surface 374. Aft surface 374 may be aft-facing. Aft surface 374 may be flush with aft edge 312 of nacelle inlet 310. Alignment feature 370 may comprise a slot 373 disposed in aft surface 374. In various embodiments, alignment feature 370 may be lofted or curved to accommodate the lofted or curved trajectory 392 of the alignment feature 372 (see FIG. 3B) of aft portion 362 with respect to forward portion 361 in response to fan cowl 320 moving from the open position to the closed position, and vice versa. Forward portion 361 may comprise a first sidewall 376 and a second sidewall 378 disposed opposite the forward portion 361 from first sidewall 376. In this regard, alignment feature 370 may be disposed at an angle α with respect to first sidewall 376. Alignment feature 370 may be disposed between first sidewall 376 and second sidewall 378.

In various embodiments, forward portion 461 may comprise an aft surface 474. Aft surface 474 may be aft-facing. Aft surface 474 may be flush with aft edge 312. Alignment feature 470 may comprise a slot 473 disposed in aft surface 474. In various embodiments, forward portion 461 may be lofted or curved to accommodate the lofted or curved trajectory 394 of alignment feature 472 (see FIG. 3C) with respect to forward portion 461 in response to fan cowl 320 moving between the open position and the closed position. Forward portion 461 may comprise a first sidewall 476 and a second sidewall 478 disposed opposite the forward portion 461 from first sidewall 476. In this regard, forward portion 461 may extend from nacelle inlet 310 an angle β. Angle β may be greater than ninety degrees (>90°). Angle β may be between ninety degrees and one hundred and fifty degrees) (90°-150°. Alignment feature 470 may be disposed parallel with sidewall 476. Alignment feature 470 may be disposed between first sidewall 476 and second sidewall 478.

In various embodiments, aft portion 362 and forward portion 361 may be composite, plastic, or metallic. In various embodiments, aft portion 362 and forward portion 361 may be formed using a composite layup process. In various embodiments, aft portion 362 and forward portion 361 may be formed using an injection molding process. Aft portion 362 and forward portion 361 may be comprised of a metallic material, such as aluminum, anodized aluminum, steel, or stainless steel, among others. Aft portion 362 and forward portion 361 may be comprised of a composite material, such as a fiber-reinforced carbon composite material, among others. Aft portion 362 and forward portion 361 may be comprised of a plastic material, such as a thermoplastic, a polyethylene-based material, a polyvinyl chloride (PVC), among others. Aft portion 362 and forward portion 361 may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Figure 4:
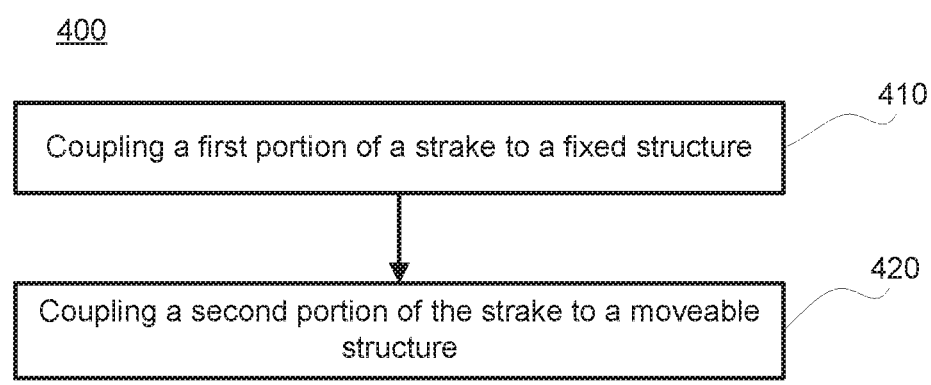
FIG. 4 illustrates a method for installing a strake, in accordance with various embodiments.

With reference to FIG. 4, a method 400 for installing a strake onto an aircraft structure is provided, in accordance with various embodiments. Method 400 includes coupling a first portion of a strake to a fixed structure (step 410). Method 400 includes coupling a second portion of a strake to a moveable structure (step 420).

With combined reference to FIG. 3A and FIG. 4, step 410 may include coupling forward portion 361 to nacelle inlet 310. Step 420 may include coupling aft portion 362 to fan cowl 320. With combined reference to FIG. 1 and FIG. 4, step 420 may include coupling forward portion 161 to fan cowl 120. Step 410 may include coupling aft portion 162 to thrust reverser 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A strake for a turbine engine nacelle, comprising:
a forward portion comprising a first alignment feature disposed at an aft end of the forward portion; and
an aft portion comprising a second alignment feature disposed at a forward end of the aft portion;
wherein the forward portion is configured to be coupled to a first aircraft structure;
the aft portion is configured to be coupled to a second aircraft structure;
the aft portion is configured to move together with the second aircraft structure with respect to the forward portion between a first position and a second position; and
the first alignment feature is configured to slidingly interlock with the second alignment feature in response to the second aircraft structure moving to the second position with respect to the first aircraft structure.

2. The strake of claim 1, wherein the aft portion engages the forward portion in response to the aft portion moving to the second position to secure the aft portion with respect to the forward portion.

3. The strake of claim 2, wherein the second aircraft structure comprises a fan cowl, and the second alignment feature engages the first alignment feature in response to the fan cowl moving to a closed position to minimize axial movement of the fan cowl with respect to an inlet of the turbine engine nacelle.

4. The strake of claim 1, wherein one of the first alignment feature and the second alignment feature comprises a tab and the other of the first alignment feature and the second alignment feature comprises a slot.

5. The strake of claim 1, wherein the strake comprises an airfoil.

6. The strake of claim 5, wherein the forward portion comprises a leading edge of the airfoil.

7. The strake of claim 6, wherein the aft portion comprises a trailing edge of the airfoil.

8. The strake of claim 1, wherein the first alignment feature is configured to receive the second alignment feature.

9. A vortex-generating arrangement, comprising:
a first aircraft structure;
a second aircraft structure;
a strake comprising two separate pieces: a forward portion and an aft portion, wherein the forward portion is coupled to the first aircraft structure and the aft portion is coupled to the second aircraft structure, and
the aft portion is configured to move together with the second aircraft structure with respect to the forward portion between a first position and a second position, and the aft portion slidingly interlocks with the forward portion in response to the second aircraft structure moving to the second position with respect to the first aircraft structure to secure the aft portion with respect to the forward portion.

10. The vortex-generating arrangement of claim 9, wherein the forward portion comprises a first alignment feature and the aft portion comprises a second alignment feature.

11. The vortex-generating arrangement of claim 10, wherein the second alignment feature slidingly interlocks with the first alignment feature in response to the aft portion moving to the second position.

12. The vortex-generating arrangement of claim 10, wherein the first position is an open position and the second position is a closed position, and the second alignment feature slidingly interlocks with the first alignment feature in response to the second aircraft structure moving to the closed position to minimize axial movement of the second aircraft structure with respect to the first aircraft structure.

13. The vortex-generating arrangement of claim 10, wherein one of the first alignment feature and the second alignment feature comprises a tab and the other of the first alignment feature and the second alignment feature comprises a slot.

14. The vortex-generating arrangement of claim 9, wherein the strake comprises an airfoil.

15. The vortex-generating arrangement of claim 14, wherein the forward portion comprises a leading edge of the airfoil.

16. The vortex-generating arrangement of claim 15, wherein the aft portion comprises a trailing edge of the airfoil.

17. The vortex-generating arrangement of claim 10, wherein the first alignment feature is configured to receive the second alignment feature.

18. A method for installing a strake onto an aircraft structure, comprising:
coupling a first portion of the strake to a fixed structure; and
coupling a second portion of the strake to a moveable structure,
wherein the second portion is configured to move together with the moveable structure with respect to the fixed structure between a first position and a second position, and the second portion slidingly interlocks with the first portion in response to the moveable structure moving to the second position to secure the moveable structure with respect to the fixed structure.

19. The method of claim 18, wherein the fixed structure comprises a nacelle inlet and the moveable structure comprises a fan cowl.

* * * * *